(12) United States Patent
Ranta et al.

(10) Patent No.: US 8,594,659 B2
(45) Date of Patent: Nov. 26, 2013

(54) METHOD FOR CONTROLLING USER EQUIPMENT MEASUREMENTS IN A NETWORK TO CONFIGURE NEIGHBOR LISTS

(75) Inventors: Jukka Ranta, Ranhamaenjata (FI); Lars Dalsgaard, Oulu (FI); Jarkko Koskela, Oulu (FI); Sari Nielsen, Espoo (FI)

(73) Assignee: Nokia Corporation, Espoo (FI)

( * ) Notice: Subject to any disclaimer, the term of this patent is extended or adjusted under 35 U.S.C. 154(b) by 800 days.

(21) Appl. No.: 11/973,882

(22) Filed: Oct. 9, 2007

(65) Prior Publication Data

US 2008/0132225 A1 Jun. 5, 2008

Related U.S. Application Data

(60) Provisional application No. 60/850,901, filed on Oct. 11, 2006.

(51) Int. Cl.
*H04W 24/00* (2009.01)

(52) U.S. Cl.
USPC ............ 455/424; 455/67.11; 455/115.1; 455/226.1; 455/446; 455/574

(58) Field of Classification Search
USPC ........... 455/572–574, 423–424, 67.11, 115.1, 455/226.1
See application file for complete search history.

(56) References Cited

U.S. PATENT DOCUMENTS

| | | | | |
|---|---|---|---|---|
| 5,640,414 A | * | 6/1997 | Blakeney et al. | 375/130 |
| 5,915,221 A | * | 6/1999 | Sawyer et al. | 455/437 |
| 6,195,552 B1 | * | 2/2001 | Jeong et al. | 455/436 |
| 7,499,700 B2 | * | 3/2009 | Dillon et al. | 455/423 |
| 2001/0031626 A1 | * | 10/2001 | Lindskog et al. | 455/67.3 |
| 2005/0042987 A1 | * | 2/2005 | Lee et al. | 455/67.11 |
| 2007/0109987 A1 | * | 5/2007 | Kohlmann et al. | 370/318 |
| 2007/0213086 A1 | * | 9/2007 | Claussen et al. | 455/513 |

FOREIGN PATENT DOCUMENTS

| | | |
|---|---|---|
| WO | WO 97/06648 | 2/1997 |
| WO | 2005/032190 | 4/2005 |
| WO | 2007/127800 | 11/2007 |

OTHER PUBLICATIONS

3GPP TSG-RAN-WG2 Meeting #54, Tallinn, Estonia, Aug. 28-Sep. 1, 2006, Agenda Item 11.6, Motorola, T-Mobile, Measurements for Network Optimization.

3GPP TSG-RAN-WG2 Meeting #54, Tallinn, Estonia, Aug. 28-Sep. 1, 2006, Agenda Item 11.6 Radio procedures in support for network (automatic?) optimization/setting, Lucent Technologies, T-Mobile, Discussion on Auto-configuration and Dynamic Optimization.

(Continued)

*Primary Examiner* — Vladimir Magloire
(74) *Attorney, Agent, or Firm* — Harrington & Smith

(57) ABSTRACT

The negative impacts on a user equipment (UE) caused by the UE's support in network self-configuration and optimization is limited to an acceptable level by controlling user equipment measurements in a network to configure neighbor lists; requesting one or more measurements; the user equipment performing measurements in one or more adjacent cells in response to one or more measurement requests; reporting the measurements; and identifying cells in the network to be included in the neighbor list such that the user equipment measurements support network self-configuration and optimization.

34 Claims, 6 Drawing Sheets

(56) References Cited

OTHER PUBLICATIONS

3GPP TSG-RAN-WG2 Ad Hoc on LTE, Cannes, France, Jun. 27-30, 2006, NTT DoCoMo, Inc., Standardisation policy for plug and play RAN.

3GPP TSG-RAN-WG2 #53, Shanghai, China, May 8-12, 2006, Agenda Item 11.3.4, T-Mobile, KPN, Complexity minimisation to setup and optimise an LTE network.

3GPP TSG-RAN-WG2 #54, Tallinn, Estonia, Aug. 28-Sep. 1, 2006, Agenda Item 11.6, T-Mobile, Support for self-configuration and self-optimisation Proposal for Stage2.

3GPP TSG-RAN WG2 #55, Oct. 6-13, 2006, Seoul, South Korea, Agenda Item 16, T-Mobile, Support for self-configuration and self-optimisation Proposal for Stage 2 (only RAN2 relevant part).

Russian Office Action dated Jul. 1, 2010, 4 pages original Korean Office Action, 3 pages English translation.

Russian Office Action dated Oct. 28, 2010 in parallel Russian patent application No. 2009117148/09, 5 pages original Russian Office Action, 3 pages English translation.

T-Mobile Self-Configuration and Self-Optimisation, Problem Statement and Definition, 3GPP TSG-RAN WG3#53bis, R3-061487, Oct. 10-13, 2006, Seoul, South Korea, 7 pages.

* cited by examiner

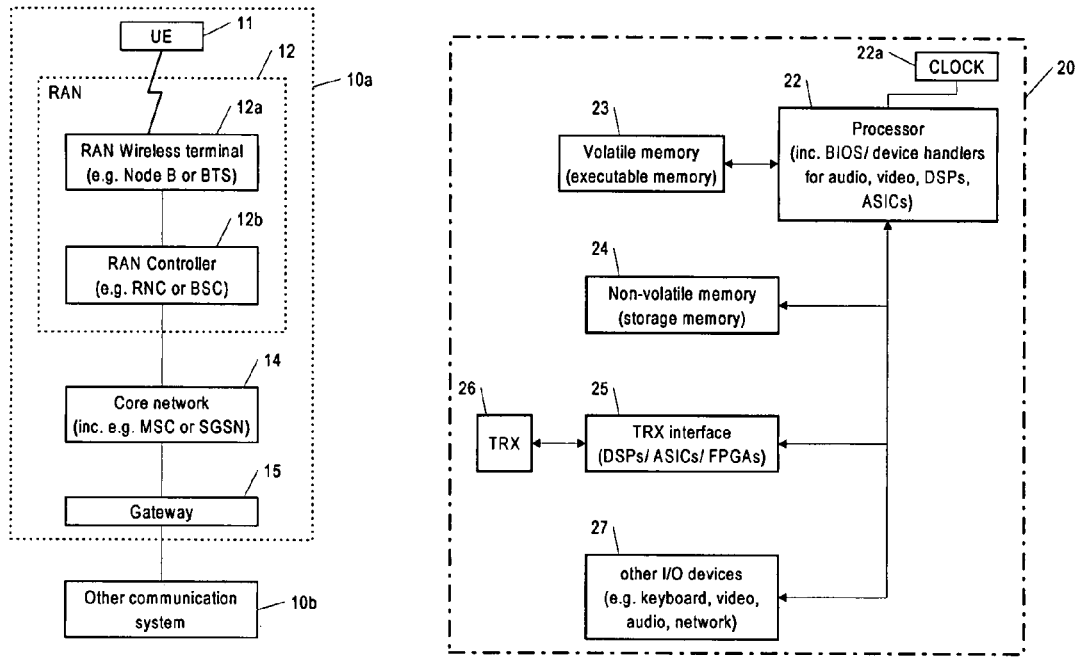
FIG. 7
FIG. 8
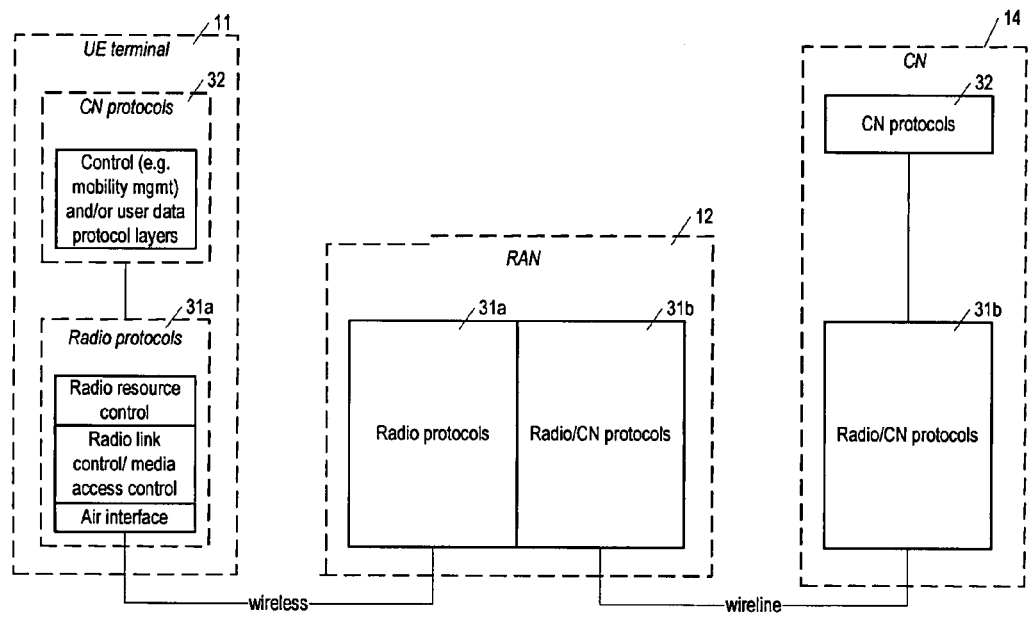
FIG. 9

METHOD FOR CONTROLLING USER EQUIPMENT MEASUREMENTS IN A NETWORK TO CONFIGURE NEIGHBOR LISTS

CROSS-REFERENCE TO RELATED APPLICATION

This application claims priority from U.S. Provisional Patent Application No. 60/850,901 filed Oct. 11, 2006.

FIELD OF THE INVENTION

The present invention relates to the field of wireless communication systems and network configuration and optimization.

More particularly, the present invention provides a control method for network configuration measurements for use in configuring neighbor lists in a cellular telecommunications system in which user equipment measurements are used to identify cells in the network to be included in the neighbor lists to support network self-configuration and optimization.

BACKGROUND OF THE INVENTION

Network configuration and optimization are time consuming and complex tasks. In a large network with a huge or extensive number of small cells, the process of determining the right or most appropriate neighbor to include in the neighbor lists that are used to configure the network is a substantial task. Therefore, It is desirable that at least a part of it could be made as automatic as possible. Various methods for making these tasks as automatic as possible are proposed in reports: R2-061545, Complexity minimization to setup and optimize an LTE network, T-Mobile, KPN; R2-061929, Standardization policy for plug and play RAN, NTT DoCoMo; R2-062230, Discussion on Auto-configuration and Dynamic Optimization, Lucent, T-Mobile; R2-062156, Measurements for Network Optimization, Motorola, T-Mobile; R2-062411, Support for self-configuration and self-optimization Proposal for Stage2, T-Mobile; R2-062940, Support for self-configuration and self-optimization Proposal for Stage2 (only RAN2 relevant part), T-Mobile. and which reports are fully incorporated herein by reference.

As it is only the terminal itself, which can accurately know what cells it is able to detect in a certain location, it is expected that the search of new neighbor cells is an area where UE support for network configuration and optimization is needed. Thus, one of the UE tasks to support network self-configuration and self-optimization is the search of neighbor cells outside the current neighbor list of the serving cell.

Normal user equipment (UE) can be used to assist network self-configuration and self-optimization if the UE is able carry out measurements on the serving cell, the neighbor cells and the search of neighbor cells outside the current neighbor list. One way to do this is to signal all the mobile terminals to measure all theoretically possible neighbors. This solution can be implemented by sending separate measurement commands to the mobile terminals or by adding the potential neighbors in the cell's neighbor list. This is a relatively simple method to get measurement data from the mobile terminals that are in various parts of the cell. In the long run, the data will show which cells are the ones that have a sufficient strength in at least some parts of the serving cell and thus should be included in the neighbor list. This approach requires a substantial measurement time period to guarantee that the entire serving cell area has been covered by the measurement data.

However, even if the extra measurements are limited to situations where the network setup has been changed (new or modified cells), continuous search, particularly of neighbor cells outside the neighbor list, will use the UE resources, most notably the battery power more than the normal neighbor cell measurements that are used for supporting handover or cell reselection evaluation.

Furthermore, this type of blind neighbor cell searches may also degrade the performance of normal neighbor cell measurements used for handover and cell reselection purposes. If the network is allowed to use the UE measurement capability for supporting network self-configuration and optimization continuously without any limitations, it is likely to have an unacceptable negative impact on user experience of terminal performance and in some scenarios on system performance as well. Because the number of measurements needed to get a statistically sufficient amount of data for the network configuration and optimization may be huge, and because it is difficult to guarantee that also the rarely used areas within the cell have been visited by at least a few mobile devices, it is important to limit the amount or numbers of the UE measurements used for network self-configuration and optimization purposes to an acceptable level in each UE. Also, because the mobile terminals carrying out the measurements move freely within the serving cell, it is impossible to know when all the places or locations in the cell have been visited by at least some mobile terminals in such a mode where measurements are possible. Usually, the mode where measurements are possible means a mobile terminal with an active connection, however, mobile terminals in the idle mode may also be used to determine neighbors in the neighbor list. Further, the extended measurements are kept active for a substantial time interval and the extra power consumption by the mobile terminals that is used in making the extended measurements for the neighbor list determination will more quickly deplete the battery charge. The faster battery discharge will in all likelihood lead to user dissatisfaction.

What is needed is a way to limit to an acceptable level the negative impacts on a UE caused by the UE's support in network self-configuration and optimization.

BRIEF DESCRIPTION OF THE DRAWINGS

FIG. 7 is a block diagram/flow diagram of a wireless communication system in which the present invention may be implemented, including various communication terminals, and in particular a user equipment (UE) terminal and a wireless terminal of a radio access network (RAN).

FIG. 8 is a reduced block diagram (only portions relevant to the invention being shown) of the UE terminal or the wireless terminal of the RAN of FIG. 7.

FIG. 9 is a reduced block diagram of two communications terminals of FIG. 7 in terms of a multi-layered communication protocol stack.

SUMMARY OF THE INVENTION

Figure 1:
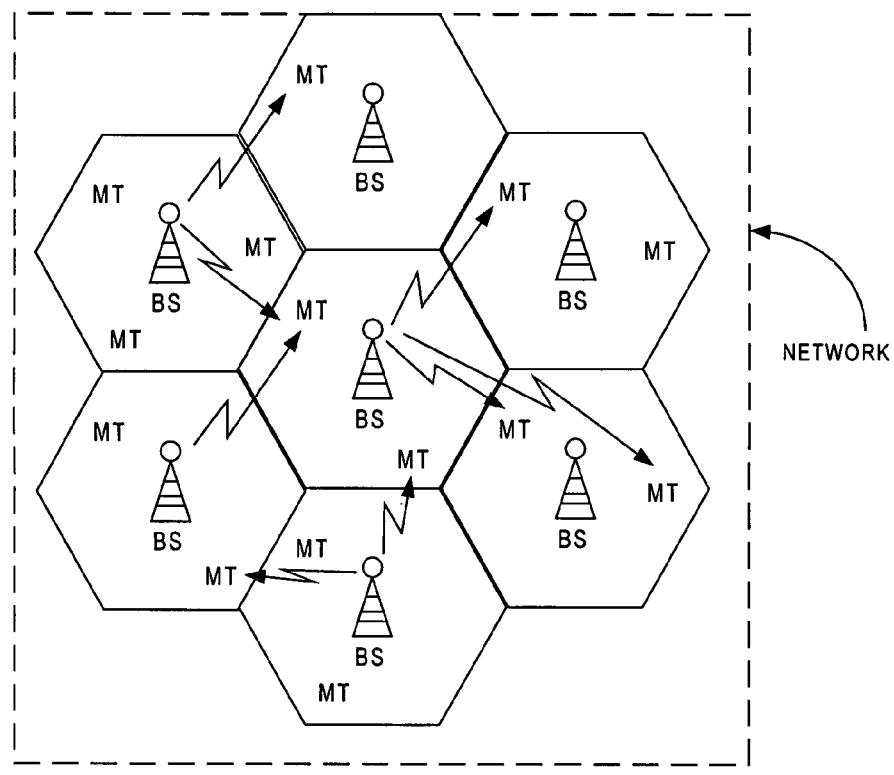
FIG. 1 is a schematic representation of a cellular telecommunications system showing a cluster of neighboring cells.

In a broad aspect of the invention, a control method for network configuration measurements in a cellular telecommunications system or network is carried out by a user equipment (UE) for determining neighbors in a neighbor list.

One embodiment of the method of invention provides, controlling user equipment measurements in a network to configure neighbor lists; requesting one or more measurements; the user equipment performing measurements in one or more adjacent cells in response to one or more measurement requests; reporting the measurements; and identifying cells in the network to be included in the neighbor list such that the user equipment measurements support network self-configuration and optimization.

In some embodiments of the invention, the method requests a user equipment measurement only when and where the network has not yet been configured or optimized properly.

In some embodiments of the invention, the method requests a user equipment measurement to measure the strength of a given neighbor cell or to search for cells on a given frequency, or report the detection of a cell or report the strength of a detected cell or to search for cells within a predetermined range of frequencies or report the detection of a cell within the predetermined range of frequencies or the strength of a detected cell.

In some embodiments of the invention, the method requests the position of a user equipment configured with positioning functionality and may request reporting the position of the user equipment with the measurement report.

In some embodiments of the invention, the method may direct measurement requests to user equipment in those areas of a cell where there is insufficient measurement data.

In some embodiments of the invention, the method may direct measurement requests on the broadcast channel (BCH) to all the possible user equipment in those areas of a cell where there is insufficient measurement data to complete the measurement data acquisitions.

In some embodiments of the invention, the method may limit the number of measurement requests to the user equipment to minimize negative impacts of the user equipment measurement support for network self-configuration and optimization purposes on user equipment performance by distributing fairly and evenly the amount of recent extra measurement requests per user equipment on the user equipment within those areas of a cell where measurement data is desired or by limiting the amount of measurements based on the UE's battery charge status such that a user equipment with a low battery charge status would perform fewer measurements than user equipment with a higher or full battery charge status or a UE with an external power source.

In some embodiments of the invention, the method may determine the user equipment measurements that a given user equipment can be requested to perform in accordance with the speed of user data transfer.

In some embodiments of the invention, the method may request the user equipment to perform serving frequency layer measurements during high traffic rate intervals, and may request the user equipment to perform non-serving frequency layer or inter-radio access technology neighbor cell measurements during low traffic rate intervals.

In some embodiments of the invention, the user equipment upon receiving a measurement request, may delay the execution of the measurement when the user equipment has one or more of: low battery charge status; a position that would incur unnecessary duplicate measurements; and an excess of recent extra measurement requests within the area of a cell where measurement data is desired.

In some embodiments of the invention, the length of the delay may be dependent upon the user equipment's degree of ability to carry out the requested measurement.

In some embodiments of the invention, the user equipment upon receiving a measurement request, may slow down or speed up the execution of the measurements in accordance with the user data transfer rate, or may comprising the user equipment upon receiving a measurement request, partially complete execution of the measurement request depending upon the measurement requested, or may decline the measurement request when the battery charge status is at a critical low level, or when the user equipment is stationary for a predetermined time interval, or may notify the network when the user equipment cannot execute the measurement request within a predetermined interval.

In some embodiments of the invention, the user equipment measurement request is to search for all cells in all frequencies.

In some embodiments of the invention, the network may reallocate the user equipment measurement request to another user equipment.

In another broad aspect the invention concerns a system including a node and at least one user equipment, such as a mobile terminal, comprising one or more modules configured to control user equipment measurements in a network to configure neighbor lists; one or more modules configured to request one or more measurements; the user equipment having one or more modules to perform measurements in one or more adjacent cells in response to one or more measurement requests; one or more module configured to report the measurements; and one or more modules configured to identify cells in the network to be included in the neighbor list such that the user equipment measurements support network self-configuration and optimization.

In another broad aspect, the invention concerns apparatus, comprising: means for controlling user equipment measurements in a network to configure neighbor lists; means for requesting one or more measurements; means for performing measurements in one or more adjacent cells in response to one or more measurement requests; means for reporting the measurements; and means for identifying cells in the network to be included in the neighbor list such that the user equipment measurements support network self-configuration and optimization.

Another broad aspect of the invention concerns a mobile terminal, comprising: one or more modules configured to control user equipment measurements in a network to configure neighbor lists; one or more modules configured to perform measurements in one or more adjacent cells in response to one or more measurement requests; one or more modules configured to report the measurements; and one or more modules to identify cells in the network to be included in the neighbor list such that the user equipment measurements support network self-configuration and optimization.

Another broad aspect of the invention concerns a computer program product with a program code, which program code is stored on a machine readable carrier, for carrying out the steps of a method comprising controlling user equipment measurements in a network to configure neighbor lists; requesting one or more measurements; the user equipment performing measurements in one or more adjacent cells in response to one or more measurement requests; reporting the measurements; and identifying cells in the network to be included in the neighbor list such that the user equipment measurements support network self-configuration and optimization, when the computer program is run in a module of the user equipment, such as a mobile terminal.

Some embodiments of the invention provide implementing the steps of the method comprising controlling user equipment measurements in a network to configure neighbor lists; requesting one or more measurements; the user equipment performing measurements in one or more adjacent cells in response to one or more measurement requests; reporting the measurements; and identifying cells in the network to be included in the neighbor list such that the user equipment measurements support network self-configuration and optimization, via a computer program running in a processor, controller or other suitable module in one or more mobile terminals, nodes or devices in the network.

WRITTEN DESCRIPTION OF EXEMPLARY EMBODIMENTS OF THE INVENTION

Figure 2:
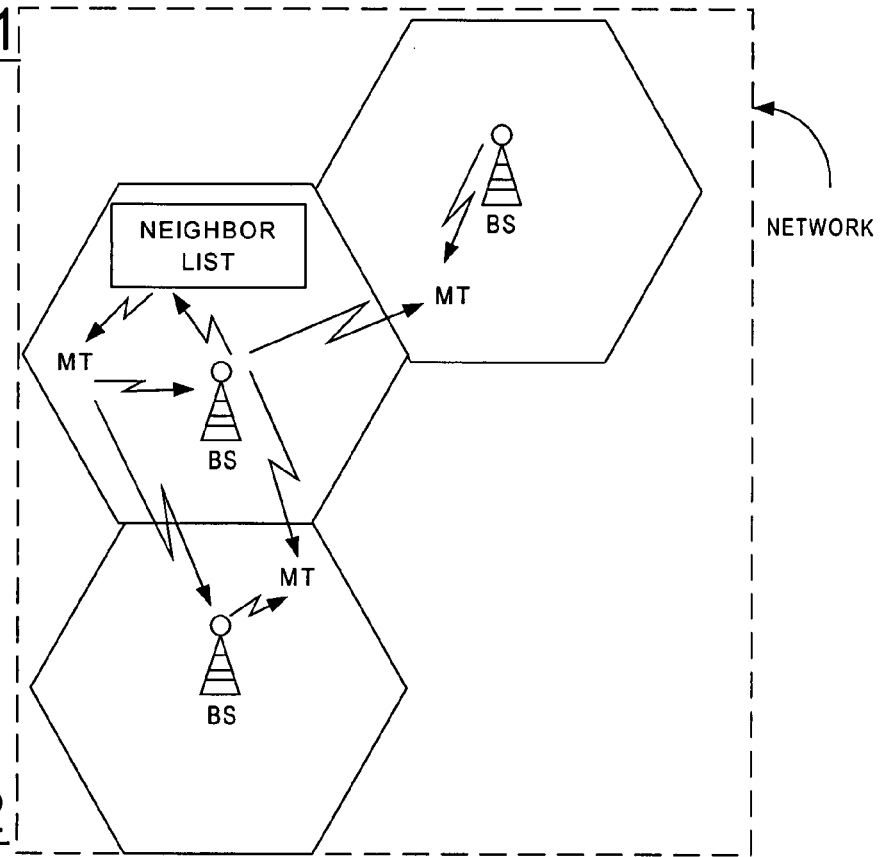
FIG. 2 is a schematic representation of an example of a mobile terminal receiving neighbor lists from adjacent cell base stations.

To make network self-configuration and optimization successful some standardization work is needed, and in particular, UE support in these self-configuration and optimization operations need to be standardized in detail. Adjacent cell measurements are carried out in all cellular telecommunications systems for example as shown in FIGS. 1 and 2. The content of the neighbor list of each cell has the utmost importance for good handover and cell re-selection operation decisions and for the whole system performance. The reliability of the handovers to adjacent cells would suffer when using cells in the neighbor list that were included from the measurements that are not primarily targeted to insure to good handovers, for example, the targeted cell may have less strength than a stronger adjacent cell that would be a better choice for handover and thus lower the quality of the connection. Accordingly, it is essential that the neighbor lists are designed properly as otherwise the mobile terminals would carry out a lot of unnecessary measurements (too many neighbors in the list) or miss cells that would be good candidates for handovers (too few neighbors in the list).

It is quite clear that all mobile devices cannot measure the network beyond the neighbor lists all the time even if they were capable of doing so. Instead we believe that these extra measurements should be based on separate measurement requests in order to be able to control UE impacts. The measurement requests should be sent to the UE only when and where the network has not been configured or optimized properly yet, i.e. in new or modified cells or in cells that are close to such cells. For example, a user equipment measurement request may be:

1) A request to measure the strength a given neighbor cell;

2) A request to search for cells on a given frequency and report the strength of the cell or just report whether a cell was detected.

3) A request to scan a given range of frequencies for any cells and report the strength of the cell or just report whether a cell was detected.

If the UE is equipped with a positioning functionality, the UE position may be reported with the measurement report. In addition, if the positioning functionality is widely available, the measurement requests can be directed to the mobile terminals in those areas of the cell where the amount of the measurement data is not yet sufficient.

The user equipment measurement requests could also be broadcast on the BCH to reach all the possible terminals in the area to complete the measurement data acquisition. However, a broadcast channel measurement request needs to be carefully be designed so that measurement burden to terminals is not continuous.

To limit the excessive use of the UE resources and keep the battery life time at an acceptable level, the user equipment measurements must be limited to such a level that they will consume only a fraction of the power of the UE. The rules for selectively restricting the number of user equipment measurements to minimize the negative impacts of UE measurement support for network self-configuration and optimization purposes on UE performance may be designed for example, to include but not be limited to the following:

1) The amount of recent extra measurements per UE should be so that the measurement load is distributed fairly and evenly on all the devices within the cell.

2) It should be possible for a UE to utilize its battery status for limiting the amount of measurements so that a UE with a low battery charge status could measure less than one with full battery charge status or a UE powered from an external power source.

3) The speed of the user data transfer at the time of the measurement request is also a useful indicator whether and what kind of measurements a certain UE can be requested to perform. For example, it is relatively easy to carry out serving frequency layer measurements when the traffic rate is high while it is easier to carry out measurements of a non-serving frequency layer or inter-RAT neighbor cells in a low-traffic situation.

If the network were to follow the criteria as used for restricting the number of UE measurements, the network would require a substantial database and excessive resources to update the data. For example, the network would need to estimate the UE power consumption for each type of measurement and calculate the cumulative power consumption of each UE, keep a record of the position of each UE (when available) to detect stationary terminals in order to avoid unnecessary duplicate measurements, and keep a record of the measurement history of each UE for a sufficient period of time. However, the network is not aware of the UE battery status and therefore lacks information to determine if the UE could make a requested measurement.

The UE has the best knowledge of most of the criteria mentioned above for restricting the number of measurements and therefore the UE should store the necessary details about the measurement history and make most of the decisions on the limitations. The network would still be the active party in the self-configuration and optimization and the network has the most control of the overall measurement allocation.

Upon receiving a measurement request, the UE may:

1) Delay the execution of the request, if one or more of the criteria above are fulfilled. The length of the delay naturally depends on the UE's degree of ability to carry out the requested measurement.

2) Slow down the execution of the measurements, especially according to the user data transfer rate. Also, the mobile terminal may slow down the measurements after a predetermined number of measurements have been carried out.

3) Carry out the request only partially if it is, for instance, a scan of all frequencies.

4) Decline the request altogether, if the battery charge status is critical or the UE has been stationary for a long time.

If the UE cannot reply to the measurement request promptly, the UE could notify the network that it cannot make or reply promptly to the measurement request so that the network may reallocate the request to another UE, if necessary.

Naturally, the UE may not decline all the measurement requests and therefore an appropriate set of rules about the minimum amount of measurements must be defined.

The rules for selectively restricting the number of measurements may be designed, for example to include but not be limited to the following:

1) The mobile terminal may either decline the measurement commands or requests or just slow down the measurements after a certain or predetermined number of measurements has been carried out.

2) The mobile terminal may also have the right to delay or carry out the measurements at a more convenient time than requested, for instance, in connection with the other measurements that are made by the mobile terminal.

3) The mobile terminal may also take into account if it has actually moved from the location where the last measurements were performed.

4) The mobile terminal may also take the battery status into account. For example. If the battery is low, it may restrict the amount or number of measurements to a very low number. On the other hand, when the mobile terminal is connected to an external power source, it can serve the network better with a higher amount or number of measurements to provide more accurate network coverage and handovers.

It should be noted the invention is not restricted to UE's or mobile terminals in an active mode and may also be applied to UE's or mobile terminals in an Idle mode.

In the active mode, the UE may use DRX and/or DTX or be continuously active while performing the measurements requested for network planning and maintenance purposes.

In the idle mode, the rules may differ from those applicable for the active mode. Additionally, the active mode rules may be varied for different DRX/DTX cycles in order to facilitate UE power saving.

In addition to the rules listed above, the following rules could additionally be designed and applied for UE's utilizing DRX:

1) The amount or number of measurements carried out by the mobile terminal may be reduced when the DRX period is used or the DRX period becomes longer, (i.e. measurement requirements may vary depending on the DRX cycle).

2) Additionally, measurement requirements may be further reduced in the idle mode, if these types of measurements are required in the idle mode in the first place.

3) The measurements performed may be restricted to a certain number or maximum number per cell.

If a UE is requested to perform these types of measurements in the idle mode, the UE may collect the measurements while in the Idle mode and report the results to the network when entering the active mode.

It should be noted the invention essentially presents a standardization control method for network configuration measurements and as such the details of the actual implementation are not limited to any given approach or hardware. The implementation of the invention itself is in the protocol stack software, however, the implementation may not be so limited.

Figure 3:
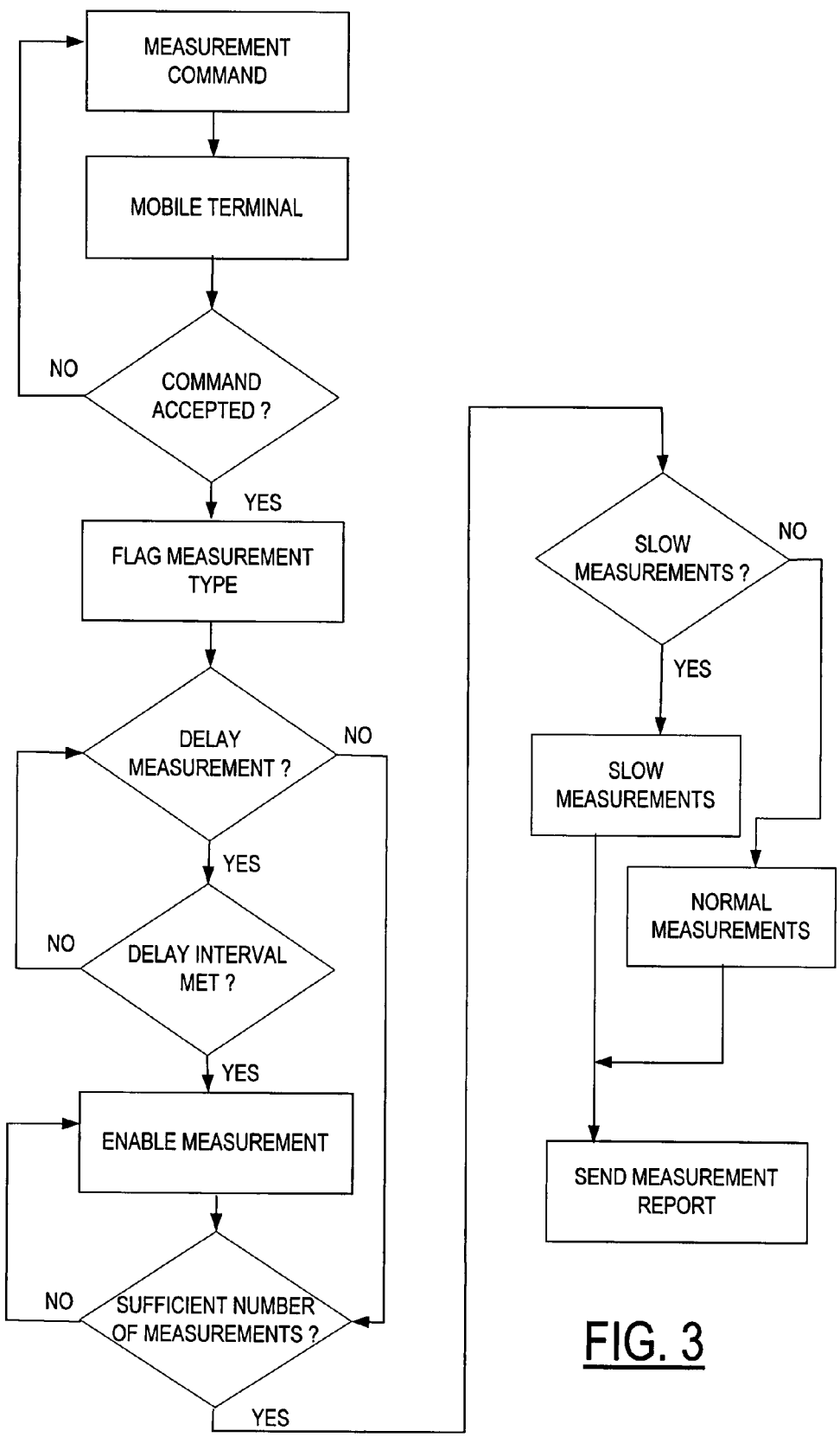
FIG. 3 is a flowchart showing an example of the present invention.

An example of the invention for determining neighbors in a neighbor list is represented by the flowchart in FIG. 3. In this example, the mobile terminal carries out suitable measurements well known to those skilled in the art to identify appropriate neighbors to include in the neighbor list. In accordance with a concept of the invention, the mobile terminal follows a set of rules to selectively restrict or limit under certain circumstances the amount or number of measurements to keep the amount or number of measurements at a reasonable level.

Figure 4:
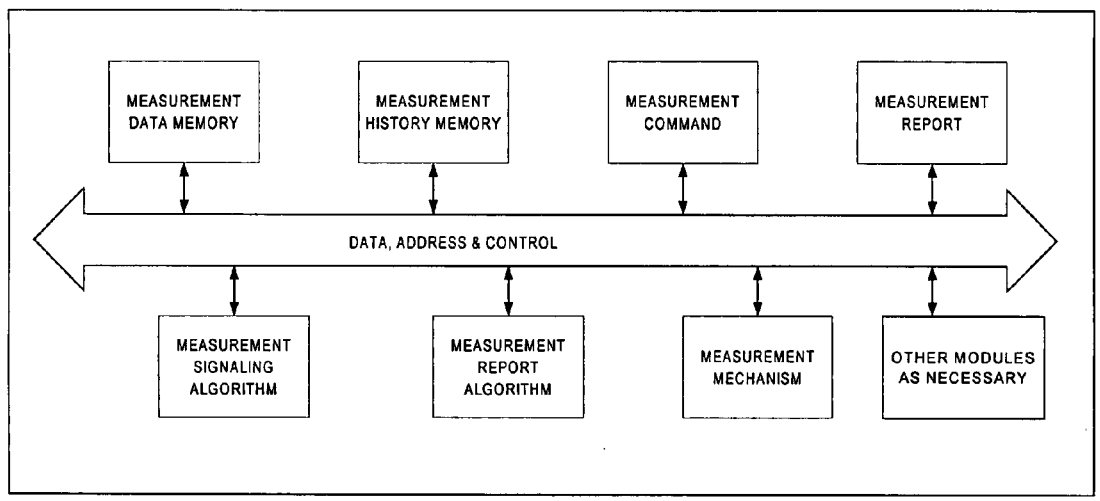
FIG. 4 is a functional block diagram showing the major functional logical elements of the present invention.

With reference to FIG. 4, a functional block diagram showing the major logical elements or modules of the invention are shown therein and described briefly below. A suitable memory is required to store the measurement data and the measurement history. The memory may be one or more memory modules and may be of any suitable technology such as, for example, flash memory. One or more appropriate algorithms are required to handle the signaling related to the measurement command and the measurement reports. One or more control algorithms are required to carry out the measurements in co-operation with the other modules of the mobile terminal. Various other modules as necessary may be provided to carry out the functions of the invention.

Figure 5:
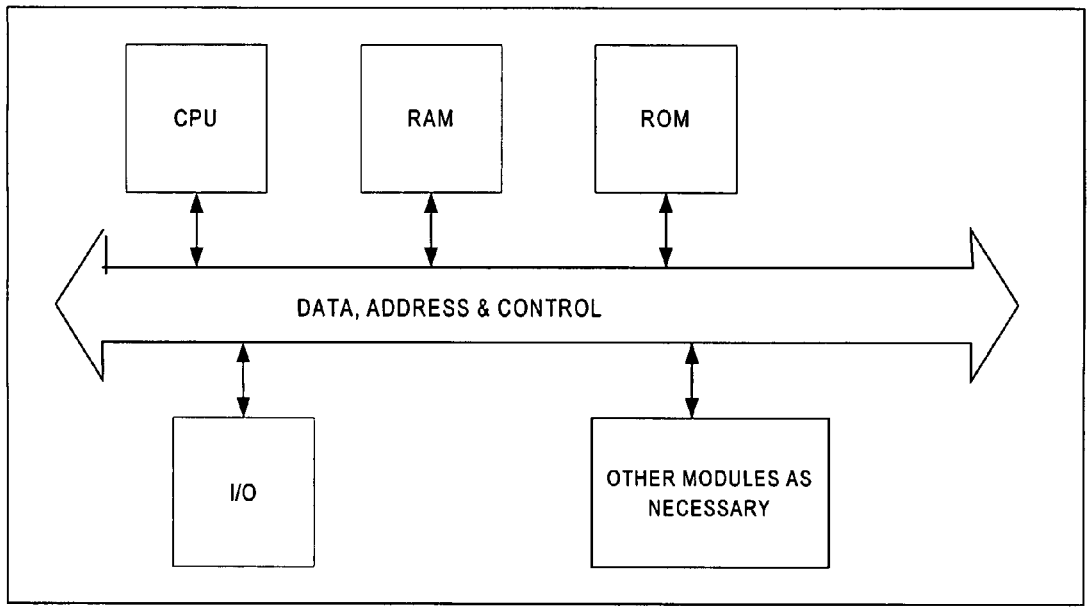
FIG. 5 is a functional block diagram of an example of a signal processor for carrying out the invention.

The interactions between the major logical elements and modules should be obvious to those skilled in the art for the level of detail needed to gain an understanding of the concept of the present invention. It should be noted that the invention may be implemented with an appropriate signal processor such as shown in FIG. 5, a digital signal processor or other suitable processor to carry out the intended function of the invention, for example, executing the algorithms, analyzing the measurement data and carrying out the operational functions of the invention. Various other modules as necessary may be provided to carry out the operations of the processor.

The invention may also be implemented as a computer program product comprising a readable storage structure embodying computer program code thereon for execution by a computer program wherein the computer program code comprises instructions for preparing a method for configuring neighbor lists in a cellular telecommunications system or network by carrying out suitable UE measurements in one or more adjacent cells to determine the appropriate cells to be included in the neighbor list.

In another example, the invention may be implemented as a computer program product with a program code, which program code is stored on a machine readable carrier, for carrying out the steps of a method comprising controlling user equipment measurements in a network to configure neighbor lists; requesting one or more measurements; the user equipment performing measurements in one or more adjacent cells in response to one or more measurement requests; reporting the measurements; and identifying cells in the network to be included in the neighbor list such that the user equipment measurements support network self-configuration and optimization, when the computer program is run in a module of the user equipment, such as a mobile terminal.

In another example, the invention provides implementing the steps of the method comprising controlling user equipment measurements in a network to configure neighbor lists; requesting one or more measurements; the user equipment performing measurements in one or more adjacent cells in response to one or more measurement requests; reporting the measurements; and identifying cells in the network to be included in the neighbor list such that the user equipment measurements support network self-configuration and optimization, via a computer program running in a processor, controller or other suitable module in one or more mobile terminals, nodes or devices in the network.

The invention is applicable to those cellular systems and networks where the adjacent cell measurements in the idle mode or in the active mode are carried out according to measurement requests by the network. When the invention is used, the measurement requests must have a flag telling the type of the measurement to be made.

If the request is a normal measurement request for the handover or cell reselection preparation, the mobile terminal has to measure the corresponding adjacent cells exactly according the request.

If the request is flagged as a measurement to support the network configuration, the mobile terminal must measure the requested neighbors or search for a neighbor without any neighbor list, for example, with carrier frequency or RAT information only if there have not been similar recent requests. Otherwise, the mobile terminal may decline the measurement request and send a corresponding rejection message to the network or delay the execution of the request.

The measurement reports may be sent to the network in the same way in all cases or with special reporting formats which may be designed for this purpose. For instance, it may be sufficient to report the detection of a new cell only and the signal level may be omitted. On the other hand, the reporting after a blind search may require a more extensive format than the usual reporting.

The flag indicating network planning and optimization measurements may be combined with additional information which may allow more or less frequent UE or mobile terminal measurements for network planning and optimization purposes. In this way the network has full control of UE or mobile terminal behavior but still makes it possible to design a good cellular system where efficient UE or mobile terminal power saving is possible.

The UE or mobile terminal neighbor cell search and level measurement activity may be dependent on the DRX/DTX cycle as well as on the mobile terminal mode (i.e. active mode vs. idle mode).

Figure 6:
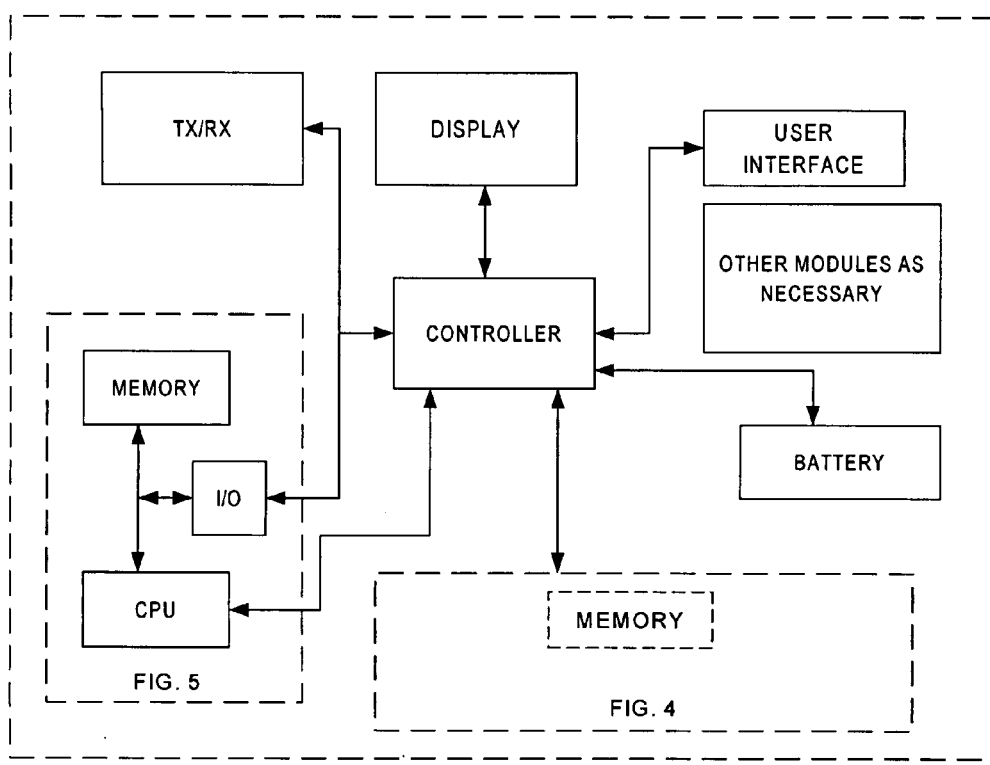
FIG. 6 is a functional block diagram of an example of a mobile terminal for carrying out the invention.

Turning now to FIG. 6, a schematic functional block diagram of a UE or mobile terminal is illustrated therein showing the major operational functional components which may be required to carry out the intended functions of the mobile terminal and implement the invention. A processor such as the signal processor of FIG. 5 carries out the computational and operational control of the mobile terminal in accordance with one or more sets of instructions stored in a memory. A user interface may be used to provide alphanumeric input and control signals by a user and is configured in accordance with the intended function to be carried out. A display sends and receives signals from the controller that controls the graphic and text representations shown on a screen of the display in accordance with the function being carried out.

The controller controls a transmit/receive unit that operates in a manner well known to those skilled in the art. The measurement functional logical elements as shown in FIG. 4 are suitably interconnected with the controller to carry out the measurements contemplated in accordance with the invention. An electrical power source such as a battery is suitably interconnected within the mobile terminal to carry out the functions described above. Various other modules as necessary may be provided to carry out the functions and operations of the UE. It will be recognized by those skilled in the art that the mobile terminal may be implemented in other ways other than that shown and described.

The invention involves or is related to cooperation between elements of a communication system. Examples of a wireless communication system include implementations of GSM (Global System for Mobile Communication) and implementations of UMTS (Universal Mobile Telecommunication System). These elements of the communication systems are exemplary only and does not bind, limit or restrict the invention in any way to only these elements of the communication systems since the invention is likely to be used for B3G systems. Each such wireless communication system includes a radio access network (RAN). In UMTS, the RAN is called UTRAN (UMTS Terretrial RAN). A UTRAN includes one or more Radio Network Controllers (RNCs), each having control of one or more Node Bs, which are wireless terminals configured to communicatively couple to one or more UE terminals. The combination of an RNC and the Node Bs it controls is called a Radio Network System (RNS). A GSM RAN includes one or more base station controllers (BSCs), each controlling one or more base transceiver stations (BTSs). The combination of a BSC and the BTSs it controls is called a base station system (BSS).

Referring now to FIG. 7, a wireless communication system 10*a* in which the present invention may be implemented is shown, including a UE terminal 11, a radio access network 12, a core network 14 and a gateway 15, coupled via the gateway to another communications system 10*b*, such as the Internet, wireline communication systems (including the so-called plain old telephone system), and/or other wireless communication systems. The radio access network includes a wireless terminal 12*a* (e.g. a Node B or a BTS) and a controller 12*b* (e.g. a RNC or a BSC). The controller is in wireline communication with the core network. The core network typically includes a mobile switching center (MSC) for circuit-switched communication, and a serving general packet radio service (GPRS) support node (SGSN) for packet-switched communication.

FIG. 8 shows some components of a communication terminal 20, which could be either the UE terminal 11 or the RAN wireless terminal 12*a* of FIG. 7. The communication terminal includes a processor 22 for controlling operation of the device, including all input and output. The processor, whose speed/timing is regulated by a clock 22*a*, may include a BIOS (basic input/output system) or may include device handlers for controlling user audio and video input and output as well as user input from a keyboard. The BIOS/device handlers may also allow for input from and output to a network interface card. The BIOS and/or device handlers also provide for control of input and output to a transceiver (TRX) 26 via a TRX interface 25 including possibly one or more digital signal processors (DSPs), application specific integrated circuits (ASICs), and/or field programmable gate arrays (FPGAs). The TRX enables communication over the air with another similarly equipped communication terminal.

Still referring to FIG. 8, the communication terminal includes volatile memory, i.e. so-called executable memory 23, and also non-volatile memory 24, i.e. storage memory. The processor 22 may copy applications (e.g. a calendar application or a game) stored in the non-volatile memory into the executable memory for execution. The processor functions according to an operating system, and to do so, the processor may load at least a portion of the operating system from the storage memory to the executable memory in order to activate a corresponding portion of the operating system. Other parts of the operating system, and in particular often at least a portion of the BIOS, may exist in the communication terminal as firmware, and are then not copied into executable memory in order to be executed. The booting up instructions are such a portion of the operating system.

Referring now to FIG. 9, the wireless communication system of FIG. 7 is shown from the perspective of layers of a protocol according to which communication is performed. The layers of protocol form a protocol stack, and include CN protocol layers 32 located in the UE 11 and CN 14, and radio protocol layers 31a located in the UE terminal and in the RAN 12 (in either the RAN wireless terminal 12a or the RAN controller 12b). Communication is peer-to-peer. Thus, a CN protocol layer in the UE communicates with a corresponding layer in the CN, and vice versa, and the communication is provided via lower/intervening layers. The lower/intervening layers thus provide as a service to the layer immediately above them in the protocol stack the packaging or unpackaging of a unit of communication (a control signal or user data).

The CN protocols typically include one or more control protocol layers and/or user data protocol layers (e.g. an application layer, i.e. the layer of the protocol stack that interfaces directly with applications, such as a calendar application or a game application).

The radio protocols typically include a radio resource control (protocol) layer, which has as its responsibilities, among quite a few others, the establishment, reconfiguration, and release of radio bearers. Another radio protocol layer is a radio link control/media access control layer (which may exist as two separate layers). This layer in effect provides an interface with the physical layer, another of the radio access protocol layers, and the layer that enables actual communication over the air interface.

The radio protocols are located in the UE terminal and in the RAN, but not the CN. Communication with the CN protocols in the CN is made possible by another protocol stack in the RAN, indicated as the radio/CN protocols stack. Communication between a layer in the radio/CN protocols stack and the radio protocols stack in the RAN may occur directly, rather than via intervening lower layers. There is, as shown in FIG. 9, a corresponding radio/CN protocols stack located in the CN, allowing then communication between the application level in the UE terminal and the application level in the CN.

Figure 10:
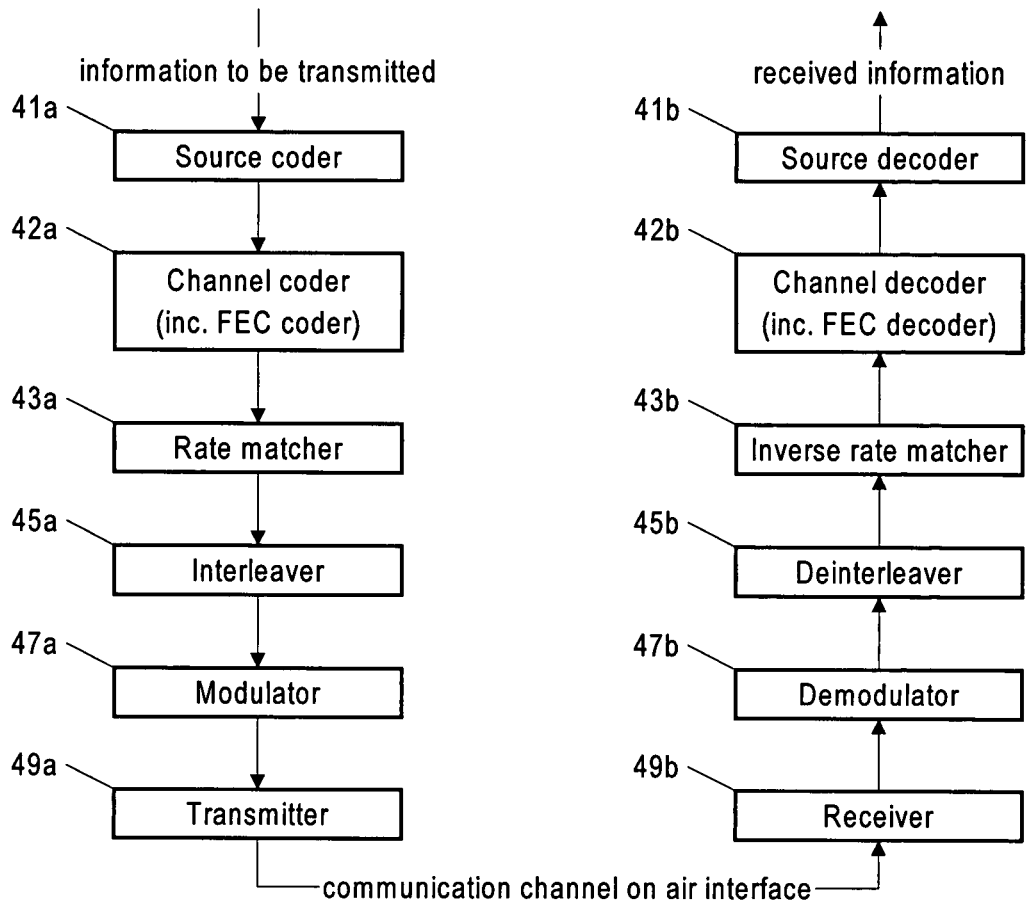
FIG. 10 is a reduced block diagram of the user equipment terminal and the wireless terminal of the radio access network in terms of functional blocks corresponding to hardware equipment used in sending and receiving communication signals over an air interface communication channel linking the two communications terminals.

FIG. 10 is a reduced block diagram of the UE communication terminal 11 and the RAN wireless communication terminal 12a of FIG. 7, in terms of functional blocks corresponding to typically hardware (but in some cases software) equipment used in sending and receiving communication signals over a communication channel linking the two communications terminals 11 12a. Both typically include a source coder 41a responsive to information to be transmitted, and a corresponding source decoder 41b. The source coder removes redundancy in the information not needed to communicate the information. Both also include a channel coder 42a and a corresponding channel decoder 42b. The channel coder typically adds redundancy that can be used to correct error, i.e. it performs forward error correction (FEC) coding. Both communication terminals also include a rate matcher 43a and corresponding inverse rate matcher 43b. The rate matcher adds or removes (by so-called puncturing) bits from the bit stream provided by the channel coder, in order to provide a bit stream at a rate compatible with the physical channel being used by the communication terminals. Both communication terminals also include an interleaver 45a and a deinterleaver 45b. The interleaver reorders bits (or blocks of bits) so that strings of bits representing related information are not contiguous in the output bit stream, thus making the communication more resistant to so-called bursty errors, i.e. to errors from temporary causes and so that affect the communication for only a limited time, and so affect only a portion of the communicated bit stream. Both communication terminals also include a modulator 47a and a demodulator 47b. The modulator 47a maps blocks of the bits provided by the interleaver to symbols according to a modulation scheme/mapping (per a symbol constellation). The modulation symbols thus determined are then used by a transmitter 49a included in both communication terminals, to modulate one or more carriers (depending on the air interface, e.g. WCDMA, TDMA, FDMA, OFDM, OFDMA, CDMA2000, etc.) for transmission over the air. Both communication terminals also include a receiver 49b that senses and so receives the communication terminal and determines a corresponding stream of modulation symbols, which it passes to the demodulator 47b, which in turn determines a corresponding bit stream (possibly using FEC coding to resolve errors), and so on, ultimately resulting in a providing of received information (which of course may or may not be exactly the transmitted information). Usually, the channel decoder includes as components processes that provide so-called HARQ (hybrid automatic repeat request) processing, so that in case of an error not able to be resolved on the basis of the FEC coding by the channel coder, a request is sent to the transmitter (possibly to the channel coder component) to resend the transmission having the unresolvable error.

The functionality described above (for both the radio access network and the UE) can be implemented as software modules stored in a non-volatile memory, and executed as needed by a processor, after copying all or part of the software into executable RAM (random access memory). Alternatively, the logic provided by such software can also be provided by an ASIC (application specific integrated circuit). In case of a software implementation, the invention is provided as a computer program product including a computer readable storage structure embodying computer program code—i.e. the software—thereon for execution by a computer processor.

A number of UE impacts due to UE measurements supporting network self-configuration and optimization has been described above together with examples for limiting negative impacts of these UE measurements in which the UE is the deciding node in limiting the amount of measurements related to the network self-configuration and self-optimization.

LIST OF ABBREVIATIONS

ACI: Adjacent Channel Interference
ACPR: Adjacent channel power ratio
AP: Access Point
B3G: Beyond 3rd Generation
CHUNK: Basic time-frequency resource unit for OFDM links
DL: Downlink
DRX: Discontinuous Reception
DTX: Discontinuous Transmission
FDD: Frequency division duplex
LTE: Long Term Evolution
MT: Mobile Terminal
NB: Narrowband (FDD mode of the WINNER system)
OFDM: Orthogonal Frequency Division Multiplexing
RAN: Radio Access Network
RAT: Radio Access Technology
TDD: Time division duplex
UE: User Equipment
UL: Uplink
UT: User Terminal
WB: Wideband (TDD mode of the WINNER system)
WLAN: Wireless Local Area Network
WINNER: Wireless World Initiative New Radio It is to be understood that the above-described arrangements are only illustrative of the application of the principles of the present invention. Numerous modifications and alternative arrangements may be devised by those skilled in the art without departing from the scope of the present invention.

The invention claimed is:

1. A method, comprising:
    sending a measurement request to a user equipment from a network during a network self-configuration and optimization process, the measurement request instructing the user equipment to search for neighboring cells in at least one given frequency specified by the network, the measurement request not comprising a list of neighbor cells or a list of candidate neighbor cells;
    receiving a report from the user equipment comprising information at least on one or more detected neighbor cells in the at least one given frequency to support the network self-configuration and optimization process; and
    configuring or modifying a list comprised of candidate neighbor cells by the network using the information received in the report from the user equipment.

2. A method comprising:
    receiving a measurement request at a user equipment from a network during a network self-configuration and optimization process, the measurement request instructing the user equipment to perform a search for neighbor cells in at least one given frequency specified by the network, the measurement request not comprising a list of neighbor cells or a list of candidate neighbor cells;
    adjusting the search to be performed by the user equipment using a predefined criterion at least for power savings;
    performing by the user equipment at least in part the requested search for neighbor cells in the at least one given frequency based on the adjustment; and
    sending a report by the user equipment to the network comprising information at least on one or more detected neighbor cells in the at least one given frequency to support the network self-configuration and optimization process.

3. The method according to claim 2, wherein said measurement request is a request to measure the strength of a given neighbor cell.

4. The method according to claim 1, wherein the reported information comprises a strength of a detected cell.

5. The method according to claim 2 wherein said measurement request is a request to search for cells within a predetermined range of frequencies.

6. The method according to claim 5, wherein the reported information comprises a detection of a cell within said predetermined range of frequencies.

7. The method according to claim 5, wherein the reported information comprises a strength of a detected cell.

8. The method according to claim 1, wherein requesting further comprises requesting a position of a user equipment configured with positioning functionality.

9. The method according to claim 8, wherein the reported information comprises a position of the user equipment with the measurement report.

10. The method according to claim 9 further comprising: directing measurement requests to user equipments in areas of a cell where there is insufficient measurement data.

11. The method according to claim 9 further comprising directing measurement requests on a broadcast channel to all possible user equipments in areas of a cell where there is insufficient measurement data to complete the measurement data acquisitions.

12. The method according to claim 1 further comprising limiting a number of measurement requests to one or more user equipments to minimize negative impacts of a user equipment measurement support for network self-configuration and optimization purposes on user equipment performance.

13. The method according to claim 12, further comprising distributing fairly and evenly an amount of recent extra measurement requests per user equipment within those areas of a cell where measurement data is desired.

14. The method according to claim 2, further comprising the user equipment limiting the amount of measurements based on a battery charge status of the user equipment such that the user equipment with a low battery charge status would perform fewer measurements than another user equipment with a higher or full battery charge status or with an external power source.

15. The method according to claim 2, further comprising determining by the user equipment measurements out of the requested one or more measurements to perform in accordance with a speed of user data transfer.

16. The method according to claim 1, further comprising requesting the user equipment to perform serving frequency layer measurements during high traffic rate intervals.

17. The method according to claim 1, further comprising requesting the user equipment by the network to perform non-serving frequency layer measurements during low traffic rate intervals.

18. The method according to claim 1, further comprising requesting the user equipment by the network to perform inter-radio access technology neighbor cell measurements during low traffic rate intervals.

19. The method according to claim 2, further comprising the user equipment upon receiving the measurement request, delaying the execution of the measurement request when the user equipment has one or more of:
    (a) low battery charge status;
    (b) a position that would incur unnecessary duplicate measurements; and
    (c) an excess of recent extra measurement requests within the area of a cell where measurement data is desired.

20. The method according to claim 19 wherein the length of the delay is dependent upon the user equipment's ability to carry out the requested measurement.

21. The method according to claim 2, further comprising the user equipment upon receiving the measurement request slowing down or speeding up the execution of the measurement request in accordance with a data transfer rate.

22. The method according to claim 2, further comprising the user equipment upon receiving the measurement request partially completing execution of the measurement request depending upon the measurement requested.

23. The method according to claim 22, wherein the measurement request is to search for all cells in all frequencies.

24. The method according to claim 2, further comprising the user equipment upon receiving a further measurement request declining the further measurement request when battery charge status is at a low level.

25. The method according to claim 2, further comprising the user equipment upon receiving a further measurement request, declining the further measurement request when the user equipment is stationary for a predetermined time interval.

26. The method according to claim 2, further comprising the user equipment upon receiving a further measurement request, notifying the network when the user equipment cannot execute the further measurement request within a predetermined interval.

27. The method according to claim 26, further comprising the network reallocating the further measurement request to another user equipment.

28. An apparatus, comprising:
at least one processor and a memory storing a set of computer instructions, in which the processor and the memory storing the computer instructions are configured to cause the apparatus in a network to:
send a measurement request to a user equipment from a network during a network self-configuration and optimization process, the measurement request instructing the user equipment to search for neighboring cells in at least one given frequency specified by the network, the measurement request not comprising a list of neighbor cells or a list of candidate neighbor cells;
receive a report from the user equipment comprising information at least on one or more detected neighbor cells in the at least one given frequency to support the network self-configuration and optimization process; and
configure or modify a list comprised of candidate neighbor cells by the network using information received in the report from the user equipment.

29. A mobile terminal, comprising:
at least one processor and a memory storing a set of computer instructions, in which the processor and the memory storing the computer instructions are configured to cause the apparatus to:
receive a measurement request at a user equipment from a network during a network self-configuration and optimization process, the measurement request instructing the user equipment to perform a search for neighbor cells in at least one given frequency specified by the network, the measurement request not comprising a list of neighbor cells or a list of candidate neighbor cells;
adjust the search to be performed by the user equipment using a predefined criterion at least for power savings;
perform by the user equipment at least in part the requested search for neighbor cells in the at least one given frequency-based on the adjustment; and
send a report by the user equipment to the network comprising information at least on one or more detected neighbor cells in the at least one given frequency to support the network self-configuration and optimization process.

30. A computer program product comprising a non-transitory computer readable medium embodying computer program code for use with a computer, the computer program code comprising:
code for sending a measurement request to a user equipment from a network during a network self-configuration and optimization process, the measurement request instructing the user equipment to search for neighboring cells in at least one given frequency specified by the network, the measurement request not comprising a list of neighbor cells or a list of candidate neighbor cells;
code for receiving a report from the user equipment comprising information at least on one or more detected neighbor cells in the at least one given frequency to support the network self-configuration and optimization process; and
code for configuring or modifying a list comprised of candidate neighbor cells by the network using information received in the report from the user equipment.

31. The method according to claim 1, wherein the reported information comprises an identification of at least one detected cell.

32. The apparatus according to claim 28, wherein computer instructions are configured to further cause the apparatus to: configure or modify a neighbor list for handover by the network using the received information on one or more detected cells.

33. A mobile terminal, comprising:
at least one processor and a memory storing a set of computer instructions, in which the processor and the memory storing the computer instructions are configured to cause the apparatus to:
receive a measurement request at the mobile terminal from a network during a network self-configuration and optimization process, the measurement request instructing the mobile terminal to perform a search for neighbor cells, the measurement request not comprising a list of neighbor cells or a list of candidate neighbor cells;
adjust the search to be performed by the mobile terminal using a predefined criterion related at least to power savings;
perform by the mobile terminal at least in part the requested search for neighbor cells based on the adjustment; and
send a report from the mobile terminal to the network comprising information at least on one or more detected neighbor cells to support the network self-configuration and optimization process; where
the mobile terminal is further configured, upon receiving a further measurement request, to decline the further measurement request when the user equipment is stationary for a predetermined time interval.

34. The mobile terminal of claim 29, further comprising:
one or more modules to identify cells to be included in a neighbor list such that the user equipment measurements support the network self-configuration and optimization.

* * * * *